United States Patent
Lin (10) Patent No.: US 7,408,723 B1
(45) Date of Patent: Aug. 5, 2008

(54) IMAGING LENS WITH HIGH RESOLUTION AND SHORT OVERALL LENGTH

(75) Inventor: Chun-Ling Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/946,311

(22) Filed: Nov. 28, 2007

(30) Foreign Application Priority Data

Aug. 22, 2007 (CN) .......................... 2007 1 0201438

(51) Int. Cl.
*G02B 13/18* (2006.01)
*G02B 9/34* (2006.01)

(52) U.S. Cl. ........................ 359/715; 359/773

(58) Field of Classification Search ................ 359/713, 359/714, 715, 773
See application file for complete search history.

(56) References Cited

U.S. PATENT DOCUMENTS

| | | | | |
|---|---|---|---|---|
| 6,917,479 B2* | 7/2005 | Park | ............................ | 359/773 |
| 6,950,246 B2* | 9/2005 | Amanai | ....................... | 359/771 |
| 7,012,765 B2* | 3/2006 | Matsui et al. | ................ | 359/771 |
| 7,061,694 B2* | 6/2006 | Amanai | ....................... | 359/773 |
| 7,215,492 B2* | 5/2007 | Sato et al. | ..................... | 359/773 |
| 7,274,518 B1* | 9/2007 | Tang et al. | ................... | 359/772 |
| 2007/0081259 A1 | 4/2007 | Noda | | |

* cited by examiner

*Primary Examiner*—Scott J Sugarman (57) ABSTRACT

An exemplary imaging lens includes, in this order from the object side to the image side thereof, a first lens of positive refraction power, a second lens of negative refraction power, a third lens of positive refraction power, and a fourth lens of negative refraction power. The imaging lens satisfies the formulas of: (1) $1<T/F<1.29$; (2) $R3/F>15$ and (3) $R7>0$, $R6<0$, where T is the overall length of the imaging lens, F is the effective focal length of the imaging lens, R3 is the radius of curvature of the object-side surface of the second lens, R6 is the radius of curvature of the image-side surface of the third lens, and R7 is the radius of curvature of the object-side surface of the fourth lens.

10 Claims, 7 Drawing Sheets

IMAGING LENS WITH HIGH RESOLUTION AND SHORT OVERALL LENGTH

BACKGROUND

1. Technical Field

The invention relates to imaging lenses and, particularly, relates to an imaging lens having a high resolution and a short overall length.

2. Description of Related Art

In order to obtain high image quality, small-sized camera modules for use in thin devices, such as mobile phones, personal digital assistant (PDA), or webcams for personal computers, must have imaging lenses with high resolution but short overall length (the distance between the object-side surface of the imaging lens and the image plane of the camera module). Factors affecting both the resolution and the overall length of the imaging lens, such as, the number and position of lenses employed, the power distribution of the employed lenses, and the shape of each employed lens, complicate any attempt at increasing resolution and shortening overall length of imaging lenses. For example, reducing the number of lenses can shorten the overall length of the imaging lens, but resolution will suffer, conversely, increasing the number of lenses can increase resolution, but increases overall length of the imaging lens.

Therefore, it is desirable to provide an imaging lens which can overcome the abovementioned problems.

SUMMARY

In a present embodiment, an imaging lens includes, in this order from the object side to the image side thereof, a first lens of positive refraction power, a second lens of negative refraction power, a third lens of positive refraction power, and a fourth lens of negative refraction power. The imaging lens satisfies the formulas of: (1) 1<T/F<1.29; (2) R3/F>15 and (3) R7>0, R6<0, where T is the overall length of the imaging lens, F is the effective focal length of the imaging lens, R3 is the radius of curvature of the object-side surface of the second lens, R6 is the radius of curvature of the image-side surface of the third lens, and R7 is the radius of curvature of the object-side surface of the fourth lens.

BRIEF DESCRIPTION OF THE DRAWINGS

Many aspects of the present imaging lens should be better understood with reference to the following drawings. The components in the drawings are not necessarily drawn to scale, the emphasis instead being placed upon clearly illustrating the principles of the present imaging lens. Moreover, in the drawings, like reference numerals designate corresponding parts throughout the several views.

DETAILED DESCRIPTION OF THE EMBODIMENTS

Embodiments of the present imaging lens will now be described in detail with references to the drawings.

Figure 1:
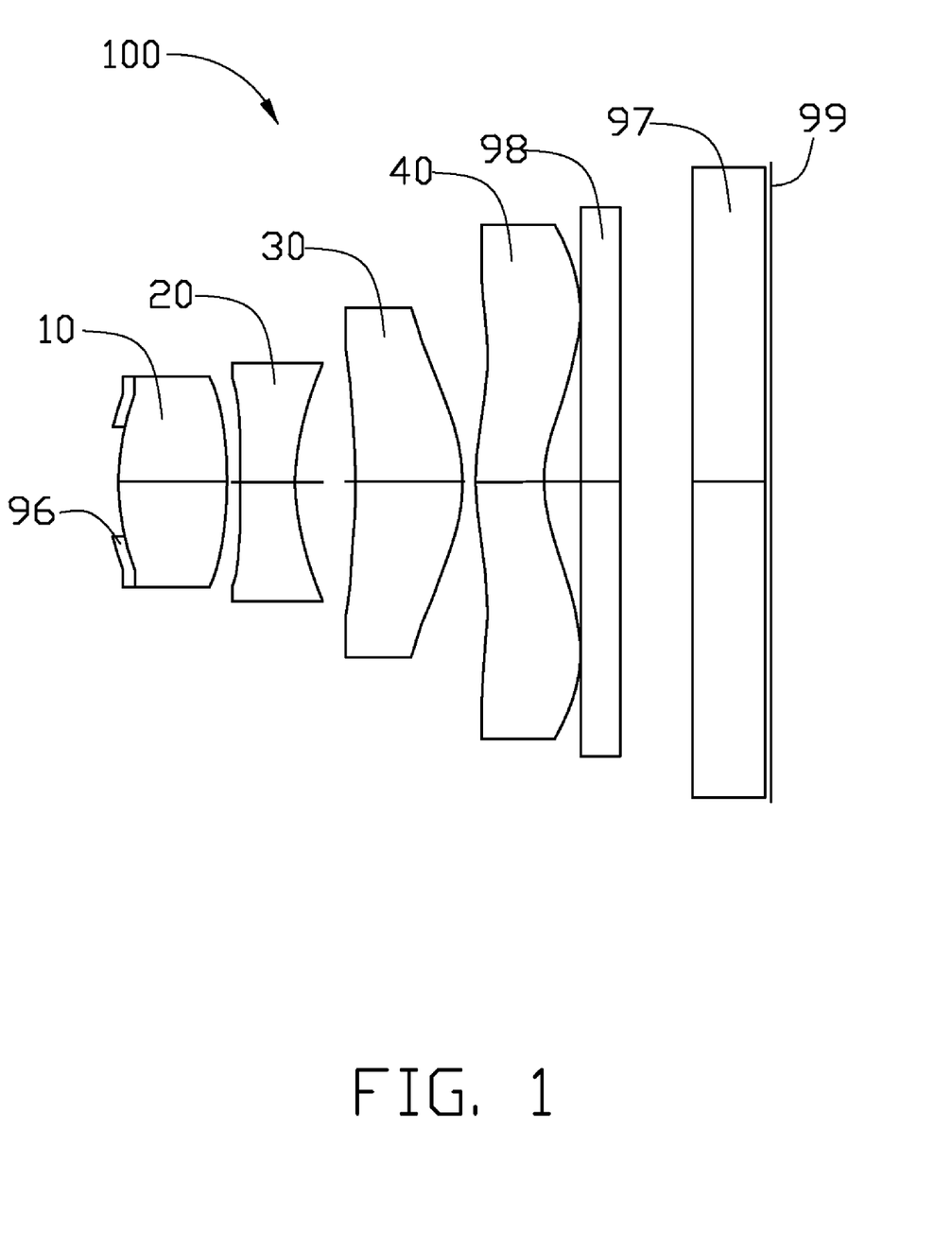
FIG. 1 is a schematic view of an imaging lens in accordance with an embodiment.

Referring to FIG. 1, the imaging lens 100, according to an exemplary embodiment, includes, in this order from the object side to the image side thereof, a first lens 10, a second lens 20, a third lens 30, and a fourth lens 40. The first lens 10 and the third lens 30 have a positive refraction power, while the second lens 20 and the fourth lens 40 have a negative refraction power. The imaging lens 100 satisfies the formulas of: (1) 1<T/F<1.29; (2) R3/F>15; and (3) R7>0, R6<0, where T is the overall length of the imaging lens 100, F is the effective focal length of the imaging lens 100, R3 is the radius of curvature of the object-side surface of the second lens 20, R6 is the radius of curvature of the image-side surface of the third lens 30, and R7 is the radius of curvature of the object-side surface of the fourth lens 40.

The formula (1) is used for bounding the overall length of the imaging lens 100 to obtain a desirable short overall length of the imaging lens 100 and control aberrations occurring in the imaging lens 100 within a correctable range. Specifically, when T/F<1.29 is not satisfied, the attempt of shortening the overall length of the imaging lens 100 encounters a challenge, on the other hand, when 1<T/F is not satisfied, aberrations occurring in the imaging lens 100 exceeds the correctable range. The formula (2) is configured for limiting the refraction power of the object-side surface of the second lens 20 to correct aberrations occurring in the imaging lens 100, especially spherical aberration. The formula (3) is adapted for limiting the refraction power of the air lens defined by the third lens 30 and the fourth lens 40 to correct aberrations occurring in the imaging lens 100, especially field curvature and distortion.

Also, the imaging lens 100 satisfies the formula: (4) D1>D12, where D1 is the width of the first lens 10 on the optical axis of the imaging lens 100, D12 is the distance between the first lens 10 and the second lens 20 on the optical axis of the imaging lens 100. The formula (4) is used for shortening the air gap between the first lens 10 and the second lens to control the overall length of the imaging lens 100.

Opportunely, the imaging lens 100 also satisfies the formula: (5) 0.5<R7/F<1. This formula (5) is for bounding the refraction power of the object-side surface of the fourth lens 40 to balance the reduction of the overall length of the imaging lens 100 and the correction of aberrations occurring in the imaging lens 100. Specifically, R7/F<1 is for reducing of the overall length of the imaging lens 100, and 0.5<R7/F is for preventing over-correcting aberrations occurring in the imaging lens 100, especially field curvature and distortion.

More opportunely, the imaging lens 100 also satisfies the formula: (6) R7>R8>0, where R8 is the radius of curvature of the image-side of the fourth lens 40. The formula (6) is adapted for limiting the refraction power of the fourth lens 40 to optimize the correction of aberrations occurring in the imaging lens 100, especially field curvature and distortion.

Specifically, the imaging lens 100 further includes an aperture stop 96. The aperture stop 96 is positioned at the object side of the imaging lens 100 to reduce the size of light flux entering the imaging lens 100. Namely, the aperture stop 96 configured for blocking off-axis light rays entering the imaging lens 100 to prevent too much field curvature and distortion occurring in the imaging lens 100, since these off-axis light rays are the main cause of field curvature and distortion. In this embodiment, the aperture stop 96 is an opaque coating on the object-side surface of the first lens 10 to shorten the overall length of the imaging lens 100, and reduce the cost of the imaging lens 100.

In order to correct chromatic aberration occurring in the imaging lens 100, the imaging lens 100 satisfies the formula:

(7) V1>55, V2<35, where V1 is the Abbe number of the first lens 10, and V2 is the Abbe number of the second lens 20.

Opportunely and specifically, the four lenses 10, 20, 30, 40 are advantageously made of plastic to reduce the cost of the imaging lens 100, and all have two aspherical surfaces (i.e., the aspherical object-side surface and the aspherical image-side surface) to efficiently correct aberrations. The aspherical surface is shaped according to the formula:

$$x = \frac{ch^2}{1 + \sqrt{1-(k+1)c^2h^2}} + \sum A_i h^i,$$

where h is a height from the optical axis of the imaging lens 100 to the aspherical surface, c is a vertex curvature, k is a conic constant, and Ai are i-th order correction coefficients of the aspheric surfaces.

Detailed examples of the imaging lens are given below in company with FIGS. 2-7, but it should be noted that the imaging lens is not limited in these examples. Listed below are the symbols used in these detailed examples:

$F_{No}$: F number;

2ω: field angle;

R: radius of curvature;

d: distance between surfaces on the optical axis of the imaging lens 100;

Nd: refractive index of lens; and

V: Abbe constant.

When capturing an image, incident light enters the imaging lens 100, transmitting through four lenses 10, 20, 30, 40, an infrared cut filter 98, and a cover glass 97, and finally is focused onto the image plane 99 to form a visual image.

Example 1

Tables 1, 2 show the lens data of Example 1, where F=3.88 mm; $F_{No}$=2.83; and 2ω=64.34°.

TABLE 1

| Surface | R (mm) | d (mm) | Nd | V |
|---|---|---|---|---|
| Object-side surface of the first lens 10 | 1.818128 | 0.8278386 | 1.53 | 1.53 |
| Image-side surface of the first lens 10 | −3.7951 | 0.1 | — | — |
| Object-side surface of the second lens 20 | 84.63214 | 0.42 | 56 | 56 |
| Image-side surface of the second lens 20 | 1.849785 | 0.4590938 | — | — |
| Object-side surface of the third lens 30 | −3.738917 | 0.8128965 | 1.621 | 1.5231 |
| Image-side surface of the third lens 30 | −1.252325 | 0.1 | — | — |
| Object-side surface of the fourth lens 40 | 2.22937 | 0.515 | 31 | 55 |
| Image-side surface of the fourth lens 40 | 0.9878145 | 0.2794997 | — | — |
| Object-side surface of the infrared filter 98 | infinite | 0.3 | 1.53 | 1.5168 |
| Image-side surface of the infrared filter 98 | infinite | 0.55 | — | — |
| Object-side surface of the cover glass 97 | infinite | 0.55 | 56 | 64.167336 |

TABLE 1-continued

| Surface | R (mm) | d (mm) | Nd | V |
|---|---|---|---|---|
| Image-side surface of the cover glass 97 | infinite | 0.05 | — | — |
| Imaging plane 99 | infinite | — | — | — |

TABLE 2

| Surface | Aspherical coefficient |
|---|---|
| Object-side surface of the first lens 10 | k = −0.3208899; A4 = −0.008720659; A6 = −0.025691257; A8 = 0.006559977; A10 = −0.068845013 |
| Image-side surface of the first lens 10 | k = −40.00118; A4 = 0.12941683; A6 = −0.140041; A8 = 0.23232111; A10 = −0.17822524 |
| Object-side surface of the second lens 20 | k = 9429.111; A4 = −0.087144146; A6 = −0.32434748; A8 = 0.51132981; A10 = −0.25987261 |
| Image-side surface of the second lens 20 | k = 0.2252486; A4 = −0.011616989; A6 = −0.13226001; A8 = 0.16736559; A10 = −0.051793889 |
| Object-side surface of the third lens 30 | k = −33.42886; A4 = 0.087122991; A6 = −0.072250773; A8 = 0.032523336; A10 = −0.020358773 |
| Image-side surface of the third lens 30 | k = −5.573073; A4 = −0.05766851; A6 = 0.061642513; A8 = −0.015817963; A10 = 0.000682426 |
| Object-side surface of the fourth lens 40 | k = −8.085471; A4 = −0.12032339 A6 = 0.03250241; A8 = −0.001175304; A10 = −0.000276995 |
| Image-side surface of the fourth lens 40 | k = −5.007089; A4 = −0.008720659; A6 = 0.02058307; A8 = 0.004447983; A10 = 0.000448093 |

Figure 2:
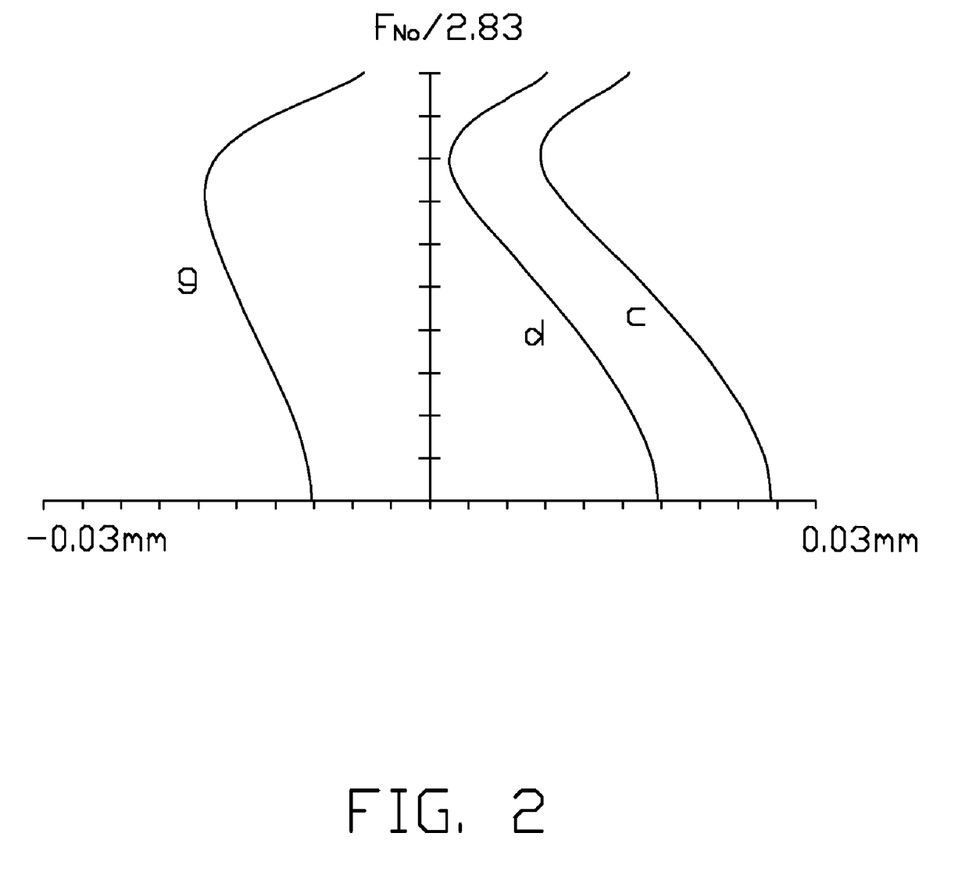
FIGS. 2-4 are graphs respectively showing spherical aberration, field curvature, and distortion occurring in the imaging lens in accordance with a first exemplary embodiment.
Figure 3:
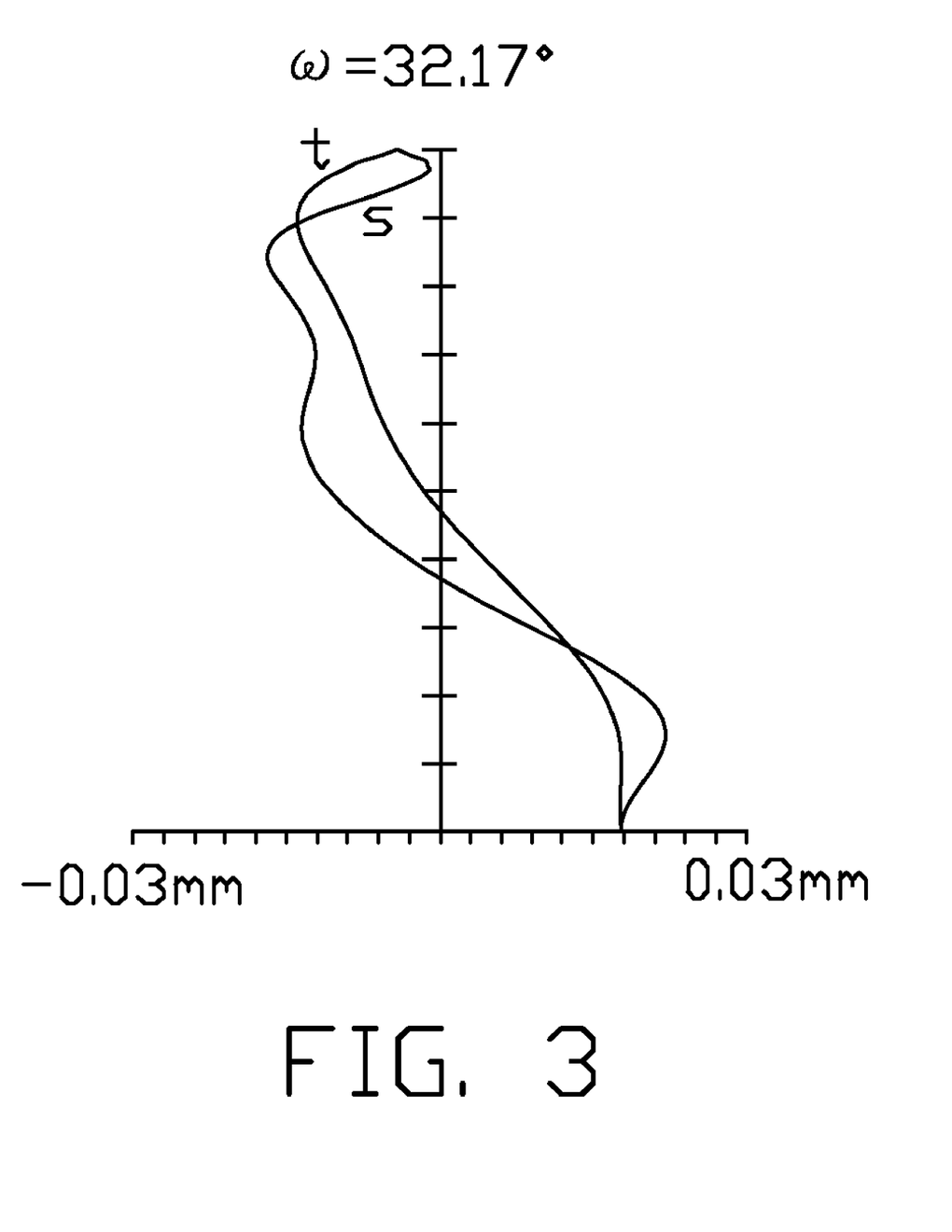
Figure 4:
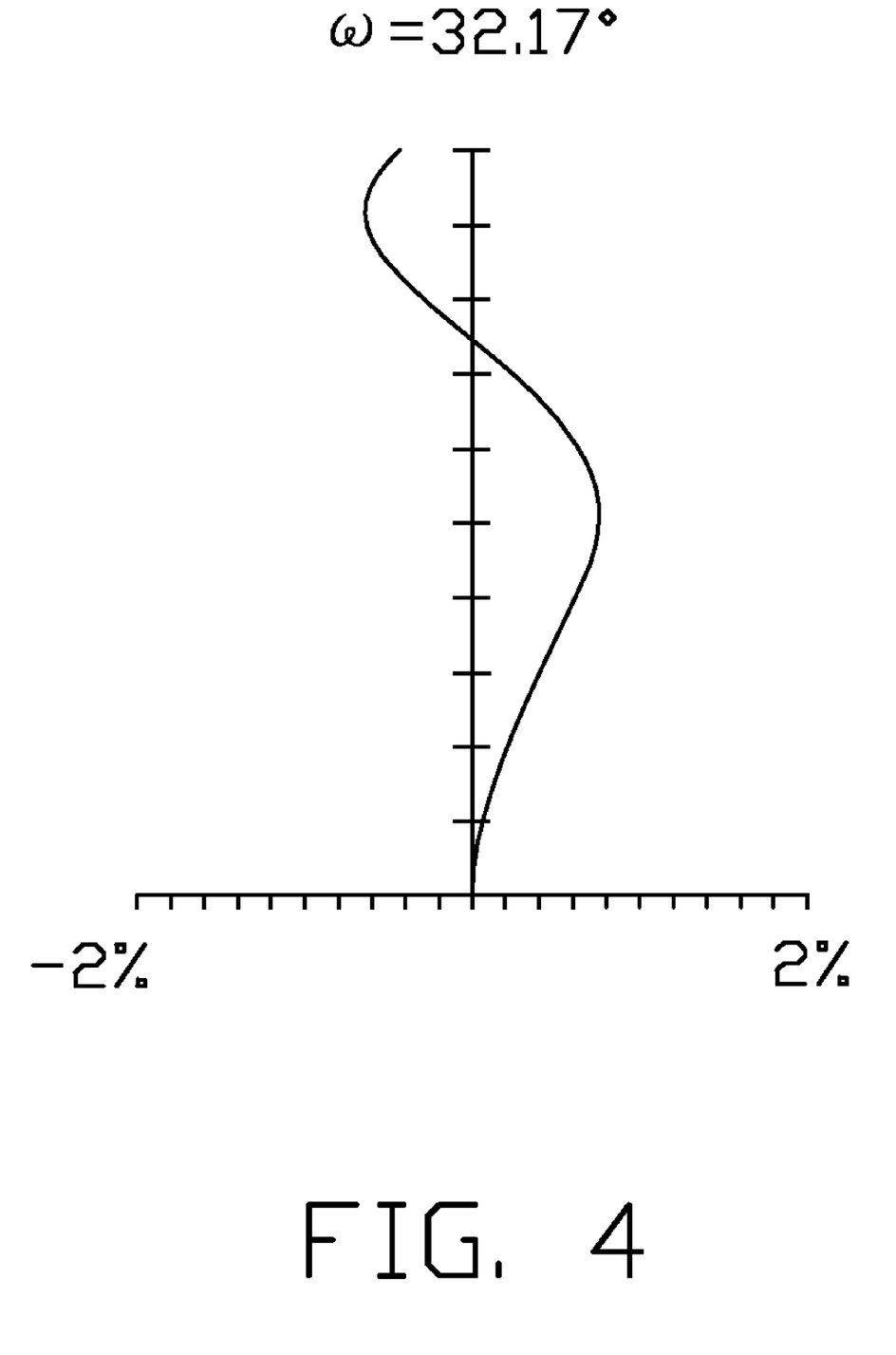

As illustrated in FIG. 2, the curves g, d, and c are respective spherical aberration characteristic curves of g light (wavelength: 435.8 nm), d light (587.6 nm), and c light (656.3 nm) occurring in the imaging lens 100 of Example 1. Obviously, spherical aberration occurring in imaging lens 100 of Example 1 is in a range of: −0.03 mm~0.03 mm. In FIG. 3, the curves t, s are the tangential field curvature curve and the sagittal field curvature curve. Clearly, field curvature occurring in the imaging lens 100 of Example 1 is limited to a range of: −0.03 mm~0.03 mm. In FIG. 4, distortion occurring in the imaging lens 100 of Example 1 is limited to be within the range of: −2%~2%.

Example 2

Tables 3, 4 show the lens data of EXAMPLE 2, where F=4 mm; $F_{No}$=2.83; and 2ω=62.78°.

TABLE 3

| Surface | R (mm) | d (mm) | Nd | V |
|---|---|---|---|---|
| Object-side surface of the first lens 10 | 1.93 | 0.8238991 | 1.523 | 1.524078 |
| Image-side surface of the first lens 10 | −3.726733 | 0.1061114 | — | — |
| Object-side surface of the second lens 20 | 79.11819 | 0.4994283 | 57 | 53.9169 |
| Image-side surface of the second lens 20 | 2.018062 | 0.5032006 | — | — |
| Object-side surface of the third lens 30 | −3.083073 | 0.8800499 | 1.61 | 1.5231 |
| Image-side surface of the third lens 30 | −1.100041 | 0.1143852 | — | — |
| Object-side surface of the fourth lens 40 | 3.028753 | 0.52 | 28 | 55 |

TABLE 3-continued

| Surface | R (mm) | d (mm) | Nd | V |
|---|---|---|---|---|
| Image-side surface of the fourth lens 40 | 1.020852 | 0.2629255 | — | — |
| Object-side surface of the infrared filter 98 | infinite | 0.3 | 1.521124 | 1.5168 |
| Image-side surface of the infrared filter 98 | infinite | 0.55 | — | — |
| Object-side surface of the cover glass 97 | infinite | 0.55 | 57.8208 | 64.167336 |
| Image-side surface of the cover glass 97 | infinite | 0.05 | — | — |
| Imaging plane 99 | infinite | — | — | — |

TABLE 3

| Surface | Aspherical coefficient |
|---|---|
| Object-side surface of the first lens 10 | k = −0.3361029; A4 = −0.008063887; A6 = −0.032207101; A8 = 0.017305872; A10 = −0.054943848 |
| Image-side surface of the first lens 10 | k = −43.05209; A4 = −0.10187049; A6 = −0.14561382 A8 = ; 0.2551684; A10 = 0.18919689 |
| Object-side surface of the second lens 20 | k = 7979.142; A4 = −0.025710951; A6 = −0.30978399; A8 = 0.47361255; A10 = −0.25752608 |
| Image-side surface of the second lens 20 | k = 0.2349351; A4 = −0.001481595; A6 = −0.11972324; A8 = 0.1391097; A10 = −0.049031954 |
| Object-side surface of the third lens 30 | k = −11.44333; A4 = 0.034197274; A6 = −0.088036075; A8 = 0.04703408; A10 = −0.02147164 |
| Image-side surface of the third lens 30 | k = −4.29671; A4 = −0.08720955; A6 = 0.045472193; A8 = −0.022745709; A10 = 0.009350425 |
| Object-side surface of the fourth lens 40 | k = −8.304533; A4 = −0.13151434; A6 = 0.032815582; A8 = −0.000926807; A10 = −0.000249353 |
| Image-side surface of the fourth lens 40 | k = −5.285415; A4 = −0.087299428; A6 = 0.020602218; A8 = −0.004611341; A10 = 0.000458899 |

Figure 5:
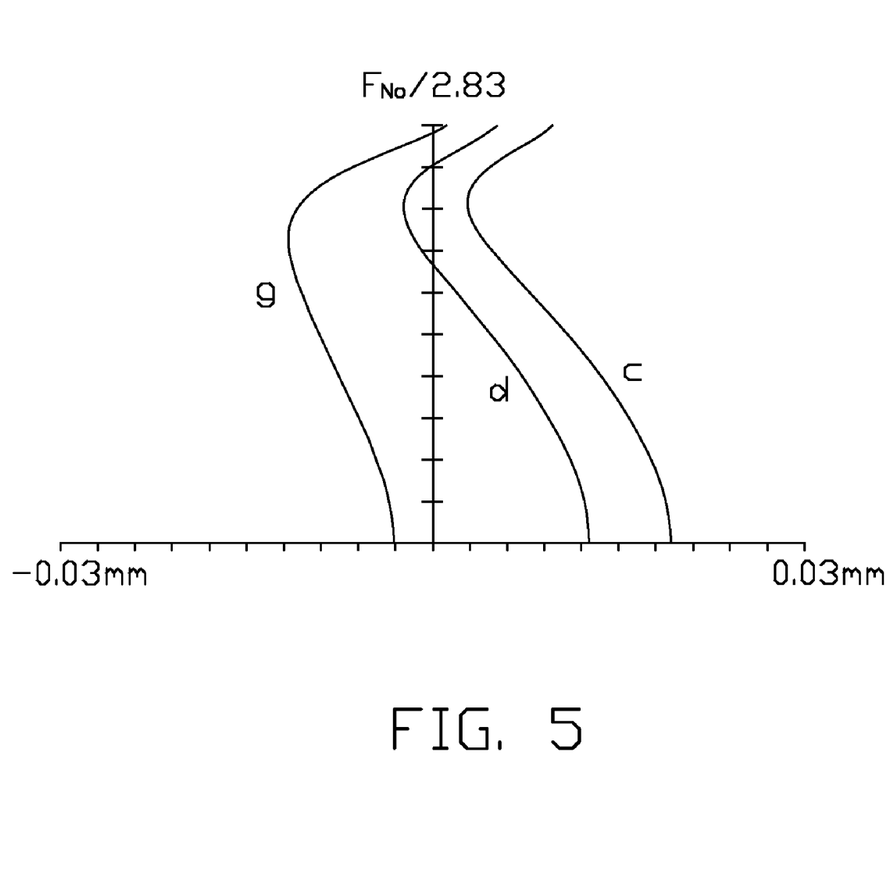
FIGS. 5-7 are graphs respectively showing spherical aberration, field curvature, and distortion occurring in the imaging lens in accordance with a second exemplary embodiment.
Figure 6:
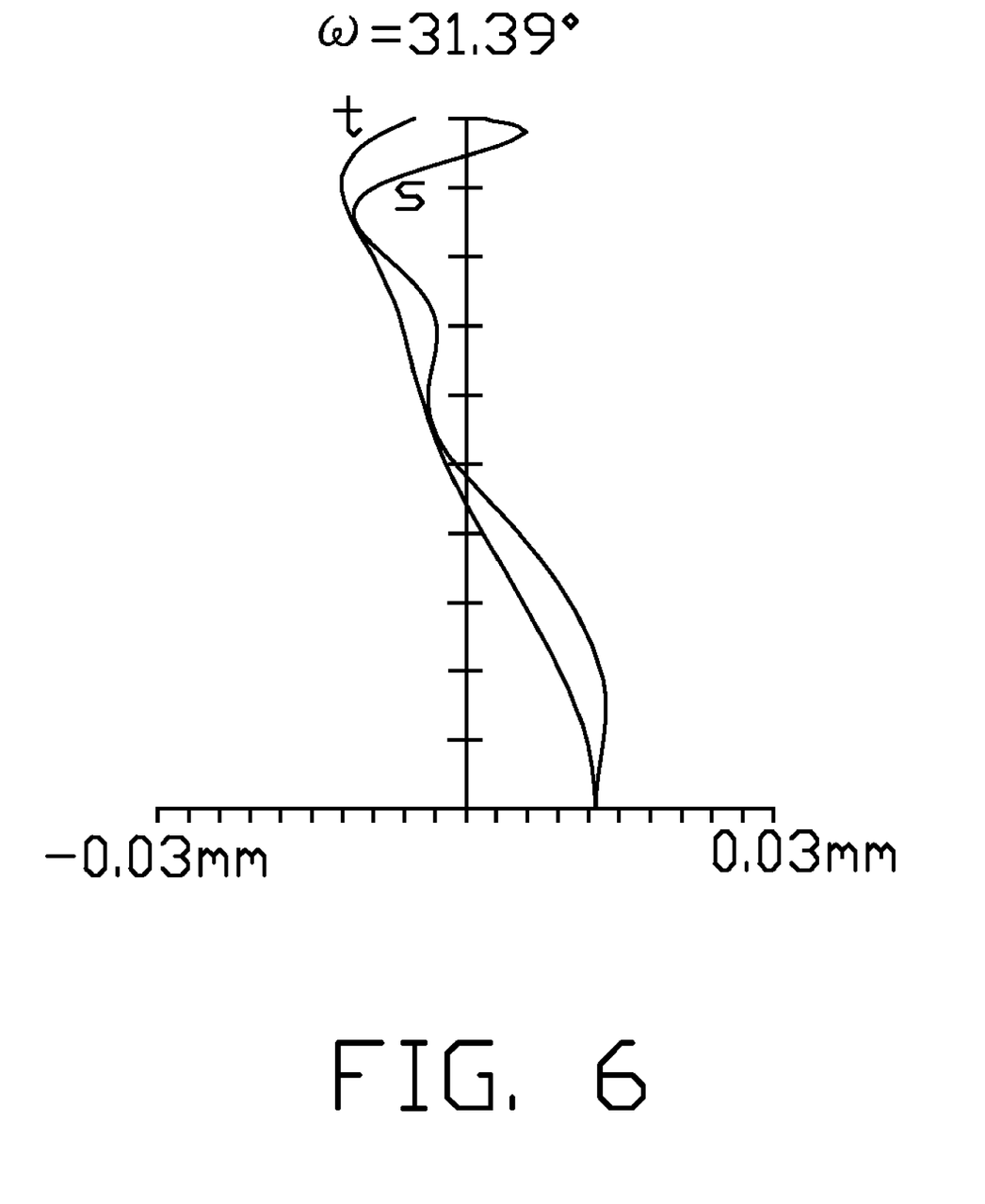
Figure 7:
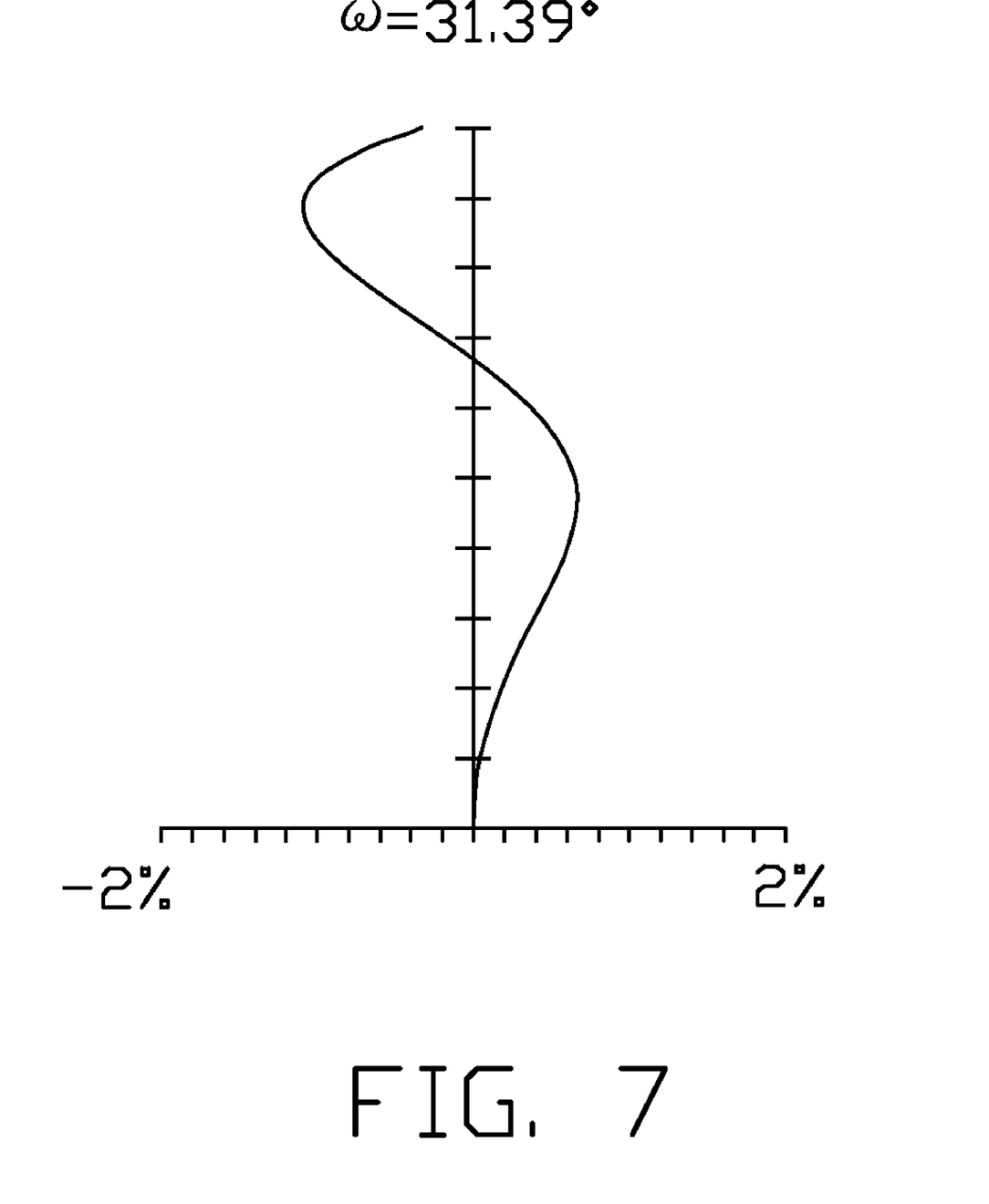

As illustrated in FIG. 5, spherical aberration occurring in imaging lens 100 of Example 2 is limited to a range of: −0.03 mm~0.03 mm. As shown in FIG. 6, field curvature occurring in the imaging lens 100 of Example 2 is limited to a range of: −0.03 mm~0.03 mm. In FIG. 7, distortion occurring in the imaging lens 100 of Example 2 is limited to be within the range of: −2%~2%.

In all, in Example 1, 2, though the overall length of the imaging lens 100 is reduced, the resolution of the imaging lens 200 is maintained, even improved, since the aberration is controlled in an acceptable range.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. An imaging lens comprising, in this order from the object side to the image side thereof, a first lens of positive refraction power, a second lens of negative refraction power, a third lens of positive refraction power, and a fourth lens of negative refraction power; the imaging lens satisfying the formulas of: $1<T/F<1.29$; $R3/F>15$; and $R7>0$, $R6<0$; where T is the overall length of the imaging lens, F is the effective focal length of the imaging lens, R3 is the radius of curvature of the object-side surface of the second lens, R6 is the radius of curvature of the image-side surface of the third lens, and R7 is the radius of curvature of the object-side surface of the fourth lens.

2. The imaging lens as claimed in claim 1, wherein the imaging lens satisfies the formula: $D1>D12$, where D1 is the width of the first lens on the optical axis of the imaging lens, D12 is the distance between the first lens and the second lens on the optical axis of the imaging lens.

3. The imaging lens as claimed in claim 1, wherein the imaging lens satisfies the formula: $0.5<R7/F<1$.

4. The imaging lens as claimed in claim 1, wherein the imaging lens satisfies the formula: $R7>R8>0$, where R8 is the radius of curvature of the image-side of the fourth lens.

5. The imaging lens as claimed in claim 1, wherein the imaging lens comprises an aperture stop, the aperture stop being positioned in the object side of the imaging lens.

6. The imaging lens as claimed in claim 5, wherein the aperture is an opaque coating on the object-side surface of the first lens.

7. The imaging lens as claimed in claim 1, wherein the imaging lens satisfies the formulas of: $V1>55$; and $V2<35$; where V1 is the Abbe number of the first lens, V2 is the Abbe number of the second lens.

8. The imaging lens as claimed in claim 1, wherein at least one of the first lens, the second lens, the third lens, and the fourth lens is comprised of plastic material.

9. The imaging lens as claimed in claim 1, wherein the first lens, the second lens, the third lens, and the fourth lens each have two aspherical surfaces.

10. The imaging lens as claimed in claim 1, wherein the imaging lens comprises an infrared cut color filter, the infrared cut color filter being positioned in the image side of the imaging lens.

* * * * *